Patented Mar. 2, 1926.

1,575,324

UNITED STATES PATENT OFFICE.

WALTER DUISBERG AND WINFRIED HENTRICH, OF WIESDORF-ON-THE-RHINE, GERMANY, ASSIGNORS TO THE GRASSELLI DYESTUFF CORPORATION, OF NEW YORK, N. Y.

PROCESS OF DYEING.

No Drawing. Application filed November 26, 1924. Serial No. 752,457.

*To all whom it may concern:*

Be it known that we, WALTER DUISBERG and WINFRIED HENTRICH, citizens of Germany, residing at Wiesdorf-on-the-Rhine, State of Prussia, Germany, have invented new and useful Improvements in Processes of Dyeing, of which the following is a specification.

We have found new and useful improvements in processes of dyeing cellulose esters and cellulose ethers.

This invention relates to the production of dyed cellulose products such as are obtained from cellulose esters and cellulose ethers, i. e., cellulose acetate silks, films made out of cellulose acetate or ethylcellulose, etc.

Whereas most mono azo colors have practically no affinity for such cellulose derivatives, we have found that very strong, deep and fast shades can be obtained on organo-oxy-cellulose compounds, if such material is dyed with azo colors such as are obtained by combining an acid substituted aromatic nitro diazo compound with an aromatic amine. For the purpose of this invention the term organo-oxy-cellulose compound is understood to cover organic cellulose esters such as cellulose acetate, cellulose formate, cellulose butyrate, etc. and cellulose ethers such as methyl cellulose, ethyl cellulose, etc.

By varying the components in the dyestuffs to be used for our dyeing process all possible shades ranging from light pink to violet blue, brown, etc. can be obtained.

Amongst the diazo compounds used in the production of our dyes we mention 2-diazo-4-nitro-benzoic acid, 1-diazo-2-nitro-4-sulfonic acid, 1-diazo-4-nitro-2-sulfonic acid, 2-diazo-5-nitro-1-phenol-ether-4'-sulfonic acid, etc. Some of the coupling compounds that can be used are: α and β-naphthylamine, N substituted - naphthylamines, amido - naphthols, etc.

The diazo compounds mentioned have the following formulæ:

2-diazo-4-nitro-benzoic acid:

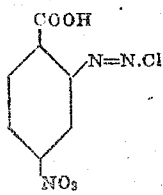

1-diazo-2-nitro-4-sulfonic acid:

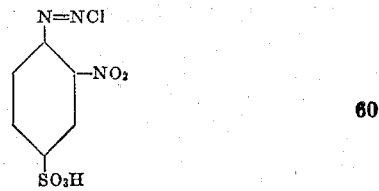

1-diazo-4-nitro-2-sulfonic acid:

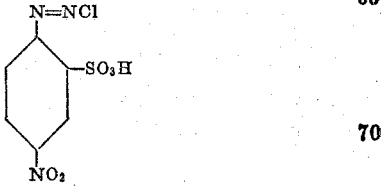

2-diazo-5-nitro-1-phenol-ether - 4'-sulfonic acid:

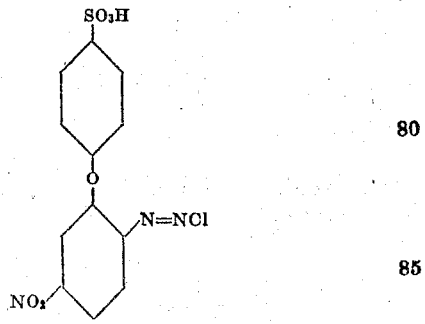

In practising our invention, the dyestuffs as characterized above are dissolved in hot water, the cellulose material is entered at about 70° C. and left in the dye bath until it is exhausted. Additions of salts to the dye bath may be of advantage in certain cases but are usually not required.

In order to further illustrate the invention the following example is given:

*Example.*

Two parts of the dyestuff 4-nitro-1-benzoate of soda-2-azo-methylbenzylaniline are dissolved in 100 parts of hot water. 25 parts of cellulose acetate threads are entered at about 70° C. and dyed for ¾ hour. The hanks are squeezed and dried in the usual way. Clear orange shades are obtained.

The dyestuff 2-nitro-4-sulfo-benzene-1-azo-ethyl-β naphthylamine dyed in a similar way produces bluish pink shades on cellulose acetate, other shades are obtained as follows:

4-nitro-2-sulfobenzene-1-azo-ethyl-β naphthylamine dyes deep violet, 2-6-dinitro benzene - 4 - sulfo - 1-azo-ethyl-α naphthylamine dyes violet, 5-nitro-4'-sulfo-1-phenylether-2-azo-1.5-amido-naphthol combined in an acid medium gives blue shades.

The formulæ of the dyestuffs referred to in the foregoing example are as follows:

4-nitro-1-benzoate of soda-2-azo-methyl-benzylaniline:

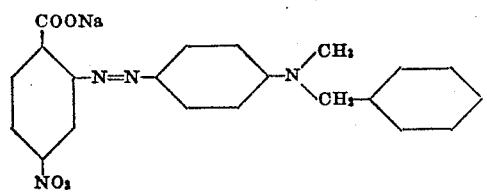

2 - nitro - 4 - sulfo - benzene-1-azo-ethyl-β - naphthylamine

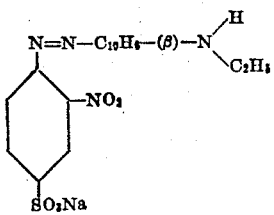

4-nitro-2-sulfobenzene-1-azo-ethyl-β-naphthylamine:

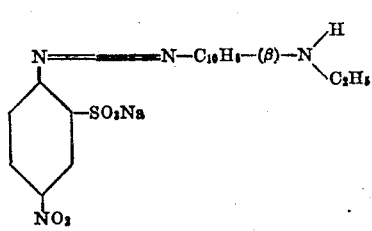

2.6-dinitro benzene-4-sulfo-1-azo-ethyl-α-naphthylamine:

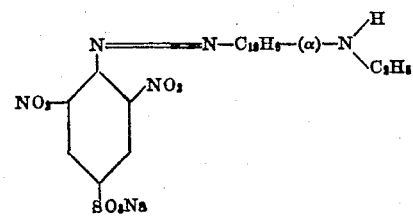

5 - nitro - 4'-sulfo-1-phenylether-2-azo-1.5-amino-naphthol:

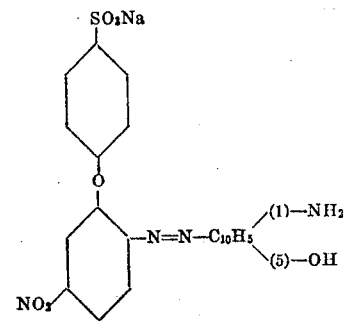

We claim:—

1. The process of dyeing organo-oxy-cellulose compounds which comprises applying thereto dyestuffs of the type R—N=N—R' in which R—N=N— stands for the diazo derivative of an acid substituted aromatic nitro compound and R' stands for an aromatic amine.

2. The process of dyeing organo-oxy-cellulose compounds which comprises applying thereto dyestuffs of the type R—N=N—R' in which R—N=N— represents the diazo derivative of an acid substituted nitrobenzene compound and R' represents an aromatic amine.

3. The process of dyeing organo-oxy-cellulose compounds which comprises applying thereto dyestuffs of the type R—N=N—R' in which R—N=N— stands for the diazo compound of a nitrobenzene sulfonic acid and R' stands for an aromatic amine.

4. The process of dyeing organo-oxy-cellulose compounds which comprises applying thereto dyestuffs of the type R—N=N—R' in which R—N=N— stands for the diazo derivative of an acid substituted aromatic nitro compound and R' stands for a naphthylamine.

5. The process of dyeing organo-oxy-cellulose compounds which comprises applying thereto dyestuffs of the type R—N=N—R' in which R—N=N— stands for the diazo compound of a nitrobenzene sulfonic acid and R' stands for a naphthylamine.

6. The process of dyeing organo-oxy-cellulose compounds which comprises applying thereto dyestuffs of the type R—N=N—R', in which R—N=N— stands for the diazo compound of a nitrobenzene sulfonic acid and R' stand for a naphthylamine substituted in the amino group, but containing no acid radical in the molecule.

In testimony whereof we have hereunto set our hands.

WALTER DUISBERG.
WINFRIED HENTRICH.